(12) United States Patent
Ema et al.

(10) Patent No.: US 11,755,204 B2
(45) Date of Patent: Sep. 12, 2023

(54) DATA MANAGEMENT SYSTEM, DATA MANAGEMENT METHOD, AND RECORDING MEDIUM FOR RECORDING DATA MANAGEMENT PROGRAM

(71) Applicant: Yokogawa Electric Corporation, Tokyo (JP)

(72) Inventors: Nobuaki Ema, Tokyo (JP); Yoshitaka Yoshida, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 17/348,799

(22) Filed: Jun. 16, 2021

(65) Prior Publication Data

US 2021/0405883 A1 Dec. 30, 2021

(30) Foreign Application Priority Data

Jun. 29, 2020 (JP) .................... 2020-111700

(51) Int. Cl.
*G06F 3/06* (2006.01)
*G01F 15/06* (2022.01)

(52) U.S. Cl.
CPC .......... *G06F 3/0608* (2013.01); *G01F 15/068* (2013.01); *G06F 3/0659* (2013.01); *G06F 3/0673* (2013.01)

(58) Field of Classification Search
CPC ..... G06F 3/0608; G06F 3/0659; G06F 3/0673
See application file for complete search history.

(56) References Cited

U.S. PATENT DOCUMENTS

| | | | |
|---|---|---|---|
| 2002/0078173 A1 | 6/2002 | Horn | |
| 2009/0025091 A1 | 1/2009 | Koike | |
| 2010/0005261 A1 | 1/2010 | Shiga | |
| 2013/0092257 A1 | 4/2013 | Yasuda | |
| 2016/0139609 A1* | 5/2016 | Smirnov | F16K 37/0091 137/551 |
| 2019/0310158 A1* | 10/2019 | Ono | G06F 17/15 |

(Continued)

FOREIGN PATENT DOCUMENTS

| | | |
|---|---|---|
| CN | 101405746 A | 4/2009 |
| CN | 110457305 A | 11/2019 |
| JP | 2010015446 A | 7/2007 |

(Continued)

OTHER PUBLICATIONS

A screen shot of the web page https://blog.datascienceheroes.com/time-series-analysis-profiling-using-max-min/ taken by archive.org Jun. 10, 2016 (Year: 2016).*

(Continued)

*Primary Examiner* — Tim T Vo
*Assistant Examiner* — Janice M. Girouard

(57) ABSTRACT

Provided a data management system which includes a data acquisition unit that acquires measurement data obtained by measuring a fluid flowing in a flow path from each of a plurality of sensors, a data recording unit that records the acquired measurement data, and a data volume reduction unit that reduces a data volume to be recorded for a target sensor based on the measurement data acquired from another sensor installed in either an upstream or a downstream from itself in the flow path among the plurality of sensors.

17 Claims, 5 Drawing Sheets

(56) References Cited

U.S. PATENT DOCUMENTS

2019/0318288 A1  10/2019  Noskov

FOREIGN PATENT DOCUMENTS

| | | |
|---|---|---|
| JP | 2007200524 A | 8/2007 |
| JP | 2013088945 A | 5/2013 |
| JP | 2019527413 A | 9/2019 |
| JP | 2020042692 A | 3/2020 |
| WO | 2016147726 A1 | 9/2016 |
| WO | 2020039067 A1 | 2/2020 |

OTHER PUBLICATIONS

Extended European Search Report for counterpart European Application No. 21180576.7, issued by the European Patent Office dated Nov. 9, 2021.
Office Action issued for counterpart Chinese Application 202110726572.8, issued by The State Intellectual Property Office of People's Republic of China dated Jul. 6, 2023.

* cited by examiner

DATA MANAGEMENT SYSTEM, DATA MANAGEMENT METHOD, AND RECORDING MEDIUM FOR RECORDING DATA MANAGEMENT PROGRAM

The contents of the following Japanese patent application are incorporated herein by reference:
NO. 2020-111700 filed in JP on Jun. 29, 2020

BACKGROUND

1. Technical Field

The present invention relates to a data management system, a data management method, and a recording medium that includes a data management program recorded therein.

2. Related Art

Patent Literature 1 describes "Of the machines and pipes of the plant 2, a process value for a machine and a pipe to which a process value estimation rule is applicable is automatically estimated".

CITATION LIST

Patent Literature

Patent Literature 1: Japanese Patent Application Publication 2020-042692

SUMMARY

In a first aspect of the invention, a data management system is provided. The data management system may include a data acquisition unit which acquires measurement data obtained by measuring a fluid flowing in a flow path from each of a plurality of sensors. The data management system may include a data recording unit which records the acquired measurement data. The data management system may include a data volume reduction unit that reduces the data volume to be recorded for a target sensor among the plurality of sensors based on the measurement data acquired from the other sensor installed in either the upstream or downstream than itself in the flow path.

A physical quantity to be measured of the other sensor may be the same as the physical quantity to be measured of the target sensor.

The data volume reduction unit may reduce the data volume to be recorded with respect to the target sensor in a target period based on the time-series change of the measurement data acquired from the other sensor in the corresponding period.

In a case where the similarity between the time-series change of the measurement data acquired from the other sensor in the corresponding period and the time-series change of the measurement data acquired from the target sensor in the target period falls within a preset range, the data volume reduction unit may reduce the data volume to be recorded with respect to the target sensor in the target period.

The data volume reduction unit may delete a part of the measurement data acquired from the target sensor with respect to at least one time excluding the start point and the end point of the target period.

The data volume reduction unit may reduce the number of samples per unit time of the measurement data acquired from the target sensor.

The data volume reduction unit may reduce a data size per one piece of the measurement data acquired from the target sensor.

The data volume reduction unit may reduce the data volume to be recorded for the target sensor in response to elapse of a preset time.

The data volume reduction unit may reduce the data volume to be recorded for the target sensor in response to the remaining recordable capacity for the measurement data falling below a preset threshold.

The data management system may further include a data transmission unit that transmits the measurement data after the data volume is reduced to other data utilization devices which utilizes the measurement data.

In a second aspect of the invention, a data management method is provided. The data management method may include acquiring measurement data obtained by measuring the fluid flowing in the flow path from each of the plurality of sensors. The data management method may include recording the acquired measurement data. The data management method may include reducing the data volume to be recorded for the target sensor among the plurality of sensors based on the measurement data acquired from the other sensor installed either on the upstream or downstream than itself in the flow path.

In a third aspect of the invention, a recording medium which includes a data management program recorded therein is provided. The data management program may be performed by a computer. The data management program may cause the computer to function as a data acquisition unit which acquires the measurement data obtained by measuring the fluid flowing in the flow path from each of the plurality of sensors. The data management program may cause the computer to function as a data recording unit which records the acquired measurement data. The data management program may cause the computer to function as a data volume reduction unit that reduces the data volume to be recorded for the target sensor among the plurality of sensors based on the measurement data acquired from the other sensor installed either on the upstream or downstream than itself in the flow path.

The summary clause does not necessarily describe all necessary features of the embodiments of the present invention. The present invention may also be a sub-combination of the features described above.

DESCRIPTION OF EXEMPLARY EMBODIMENTS

Hereinafter, the invention will be described through embodiments, but the following embodiments do not limit the invention according to the claims. In addition, not all of the combinations of features described in the embodiments are essential to the solving means of the invention.

Figure 1:
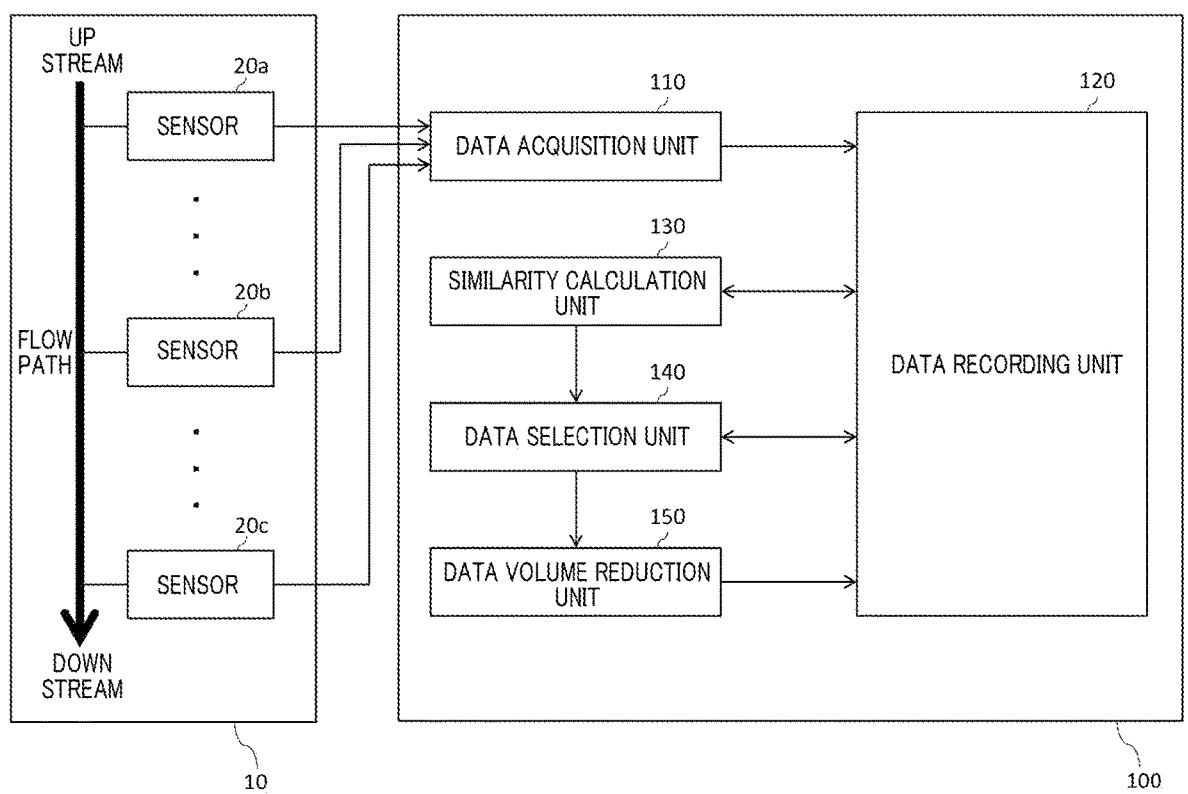
FIG. 1 illustrates an example of a block diagram of a data management system 100 according to this embodiment together with a plant 10.

FIG. 1 illustrates an example of a block diagram of a data management system 100 according to this embodiment together with a plant 10. In this drawing, a case where the data management system 100 manages the measurement data acquired from a plurality of sensors 20 which are installed in the plant 10 is shown as an example. However, the invention is not limited to this. The data management system 100 may manage measurement data from one or more sensors 20 installed at any location different from the plant 10.

Herein, in addition to an industrial plant such as a chemical plant, the plant 10 may be a plant for managing and controlling a well source such as a gas field or an oil field and the surroundings thereof, a plant for managing and controlling power generation such as hydropower, thermal power, nuclear power, or the like, a plant for managing and controlling environmental power generation such as solar power, wind power, or the like, and a plant for managing and controlling water and sewage, dams, or the like. In the plant 10, a fluid flows from the upstream to the downstream of a flow path, and the process proceeds. In such a plant 10, there may be installed one or more sensors 20. In this drawing, a case where at least a sensor 20a, a sensor 20b, and a sensor 20c (collectively referred to as "sensor 20") are installed in the plant 10 is shown as an example.

The sensor 20 may be capable of acquiring the measurement data which is obtained by measuring the fluid flowing in the flow path. The sensor 20 may be, for example, a sensor installed in an OT (Operational Technology) region (for example, a sensor for process control (measurement)) or an IoT (Internet of Things) sensor. As an example, the plurality of sensors may be industrial sensors that are connected to or integrally formed with one or more field devices installed in a plant.

In addition, the field device installed in such a plant may be, for example, a sensor such as a pressure gauge, a flow meter, a temperature sensor, or the like, a valve such as a flow rate control valve, an opening/closing valve, or the like, an actuator device such as a fan, a motor, or the like, an imaging device such as a camera or a video for capturing a situation or a target body in the plant, an audio device such as a microphone, a speaker, or the like which collects noises in the plant or issues an alarm, and a position detection device for outputting position information of each device.

Here, the physical quantity to be measured of each of the plurality of sensors 20 may be the same. That is, all the sensors 20a to 20c may be capable of acquiring the measurement data of the same physical quantity. Instead, the physical quantity to be measured by each of the plurality of sensors 20 may be partially or totally different. That is, some of the sensors 20a to 20c may be capable of acquiring the measurement data of different physical quantities, or all the sensors 20a to 20c may be capable of acquiring the measurement data of different physical quantities.

In this embodiment, as an example, it is assumed that the sensor 20a is a flow meter which is installed near the upstream in the flow path where the fluid flows. In addition, it is assumed that the sensor 20c is a flow meter which is installed near the downstream in the flow path. In addition, it is assumed that the sensor 20b is a flow meter which is installed on the downstream side from the sensor 20a in the flow path which is near the midstream on the upstream side from the sensor 20c. It is then assumed that, in this embodiment, the data management system 100 respectively acquires, as the measurement data, at least a flow rate Fa near the upstream from the sensor 20a, a flow rate Fb near the midstream from the sensor 20b, and a flow rate Fc near the downstream from the sensor 20c.

The data management system 100 according to this embodiment acquires and records the measurement data from each of the plurality of sensors 20. Then, the data management system 100 reduces the data volume to be recorded for the target sensor 20 based on the measurement data acquired from the other sensor 20 installed either on the upstream or downstream from itself in the flow path.

The data management system 100 may be a computer such as a PC (personal computer), a tablet computer, a smart phone, a workstation, a server computer, or a general purpose computer, or may be a computer system in which a plurality of computers are connected. Such a computer system is also a computer in a broader sense. In addition, the data management system 100 may be implemented by one or more virtual computer environments that can run in a computer. Instead, the data management system 100 may be a dedicated computer designed for data management, or may be a dedicated hardware realized by a dedicated circuit. In a case where the data management system 100 can be connected to the Internet, the data management system 100 may be realized by cloud computing.

The data management system 100 includes a data acquisition unit 110, a data recording unit 120, a similarity calculation unit 130, a data selection unit 140, and a data volume reduction unit 150. Note that these blocks may be functional blocks which are functionally separated from each other, and may not necessarily be consistent with the actual device configuration. In other words, a block may not necessarily be composed of one device just because the block is shown as one block in this drawing. In addition, blocks each may not necessarily be composed of separate devices just because the blocks are shown as separate blocks in this drawing.

The data acquisition unit 110 acquires the measurement data obtained by measuring the fluid flowing in the flow path from each of the plurality of sensors 20. As an example, the data acquisition unit 110 may be a communication unit and, for example, sequentially acquires the measurement data obtained by measuring the fluid flowing in the flow path from each of the plurality of sensors 20 via a communication network.

Such a communication network may be a network that connects a plurality of computers. For example, the communication network may be a global network in which a plurality of computer networks are connected to each other. For example, the communication network may be the Internet or the like using an Internet protocol. Instead, the communication network may be realized by a dedicated line. In other words, the data acquisition unit 110 can also directly or indirectly exchange data with a mobile phone, a smart phone, a fourth-generation (4G) terminal, a fifth-generation (5G) terminal, and the like to acquire the measurement data.

In the above description, a case where the data acquisition unit 110 acquires the measurement data from each of the plurality of sensors 20 via the communication network is shown as an example, but the invention is not limited to this. The data acquisition unit 110 may acquire the measurement data from each of the plurality of sensors 20 via other means, such as a user input or various types of memory devices, which is different from the communication network.

The data acquisition unit 110 may acquire, for example, the measurement data such as a flow rate, a pressure, a temperature, and a combination of these from each of the plurality of sensors 20. In addition, the data acquisition unit 110 may acquire, as the measurement data, a value generated using a numerical expression based on these pieces of data. The data acquisition unit 110 supplies the measurement data acquired from each of the plurality of sensors 20 to the data recording unit 120.

The data recording unit 120 records the acquired measurement data. As an example, the data recording unit 120 may sequentially record, for each sensor, the measurement data from the plurality of sensors 20 which is supplied from the data acquisition unit 110.

The similarity calculation unit 130 may be capable of accessing the data recording unit 120, and browses the measurement data from the plurality of sensors 20 recorded in the data recording unit 120. Then, the similarity calculation unit 130 calculates a similarity of a time-series change with the measurement data acquired from the other sensor 20 installed either in the upstream and downstream from itself in the flow path, for each piece of the measurement data acquired from the plurality of sensors 20. This will be described later. The similarity calculation unit 130 supplies the information on the calculated similarity to the data selection unit 140.

The data selection unit 140 refers to the information on the similarity supplied from the similarity calculation unit 130. Then, the data selection unit 140 selects a data group, which is to be reduced in the data volume, among the measurement data from the plurality of sensors 20 which is recorded by the data recording unit 120. As an example, the data selection unit 140 may select the measurement data acquired from a certain sensor 20 in a certain period as a data group which is to be reduced in the data volume. The data selection unit 140 supplies the information on the selected data group to the data volume reduction unit 150.

Then, the data volume reduction unit 150 reduces the data volume to be recorded for the target sensor 20 among the plurality of sensors 20 based on the measurement data acquired from the other sensor 20 installed either on the upstream or downstream from itself in the flow path. Note that, at this time, the other sensor 20 may have the same physical quantity to be measured as a target sensor 20. More specifically, for example, the data volume reduction unit 150 specifies a target period and a target sensor 20 to be reduced in the data volume by referring to the information on the data group selected by the data selection unit 140. Then, the data volume reduction unit 150 reduces the data volume to be recorded for the measurement data acquired from the target sensor 20 in the target period among the measurement data recorded by the data recording unit 120.

Figure 2:
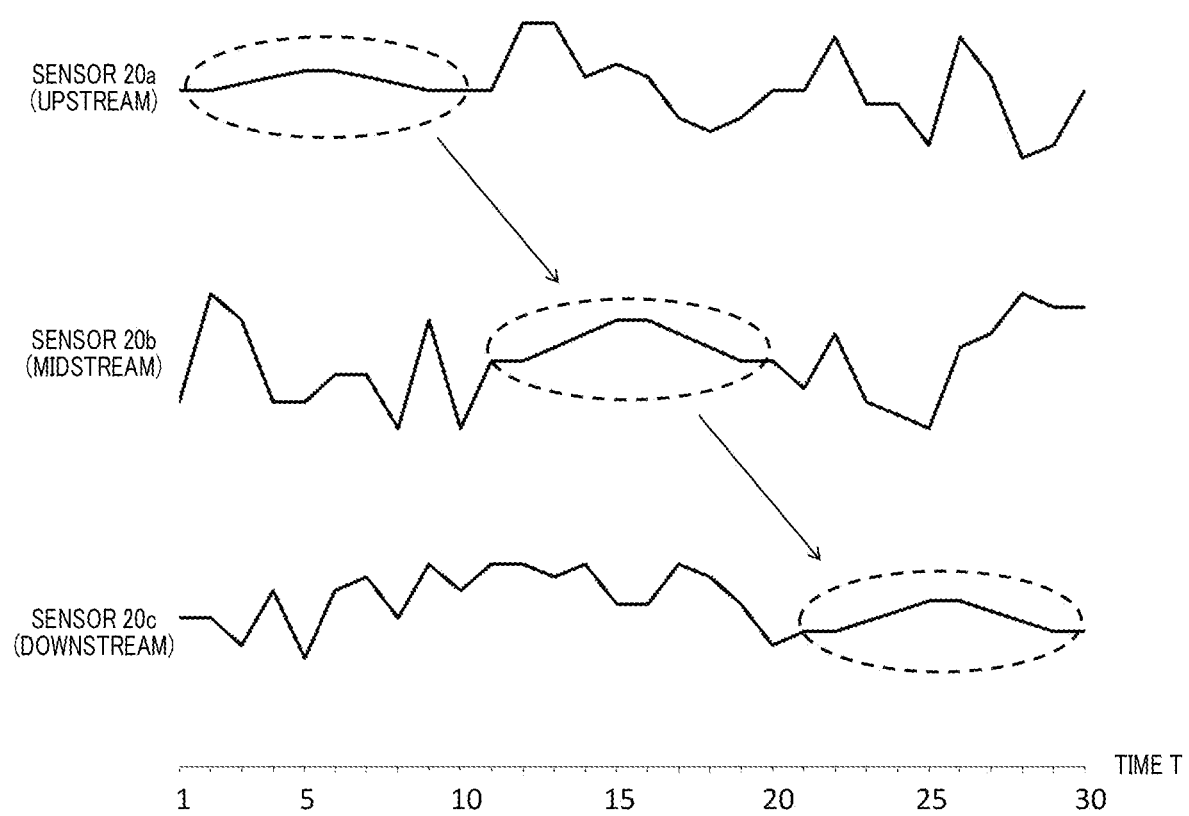
FIG. 2 illustrates an example of measurement data which is managed by the data management system 100 according to this embodiment.

FIG. 2 illustrates an example of the measurement data which is managed by the data management system 100 according to this embodiment. In this drawing, the measurement data acquired by the data management system 100 from three sensors 20, namely, the sensor 20a, the sensor 20b, and the sensor 20c is illustrated as an example. However, the invention is not limited to this. The data management system 100 may acquire the measurement data from one or more sensors 20 that is more or less than three sensors 20.

As described above, in this embodiment, as an example, it is assumed that the sensor 20a is a flow meter which is installed near the upstream in the flow path where the fluid flows. In addition, it is assumed that the sensor 20c is a flow meter which is installed near the downstream in the flow path. In addition, it is assumed that the sensor 20b is a flow meter which is installed on the downstream side from the sensor 20a in the flow path which is near the midstream on the upstream side from the sensor 20c. It is then assumed that, in this embodiment, the data management system 100 respectively acquires, as the measurement data, the flow rate Fa near the upstream from the sensor 20a, the flow rate Fb near the midstream from the sensor 20b, and the flow rate Fc near the downstream from the sensor 20c.

In this drawing, in the order from above, the flow rate Fa, the flow rate Fb, and the flow rate Fc, which are the measurement data from the sensor 20a, the sensor 20b, and the sensor 20c, are illustrated sequentially from time T=1 to time T=30. In this drawing, a case where the data management system 100 acquires the measurement data from all the sensors 20 in synchronization with time is shown as an example. However, the invention is not limited to this. The data management system 100 may asynchronously acquire the measurement data from at least some of the plurality of sensors 20.

The data management system 100 according to this embodiment acquires and records, for example, the measurement data as shown in this drawing. Then, the data management system 100 reduces the data volume to be recorded for the target sensor 20 based on the measurement data acquired from the other sensor 20 installed either on the upstream or downstream from itself in the flow path. This will be described in detail using a flow.

Figure 3:
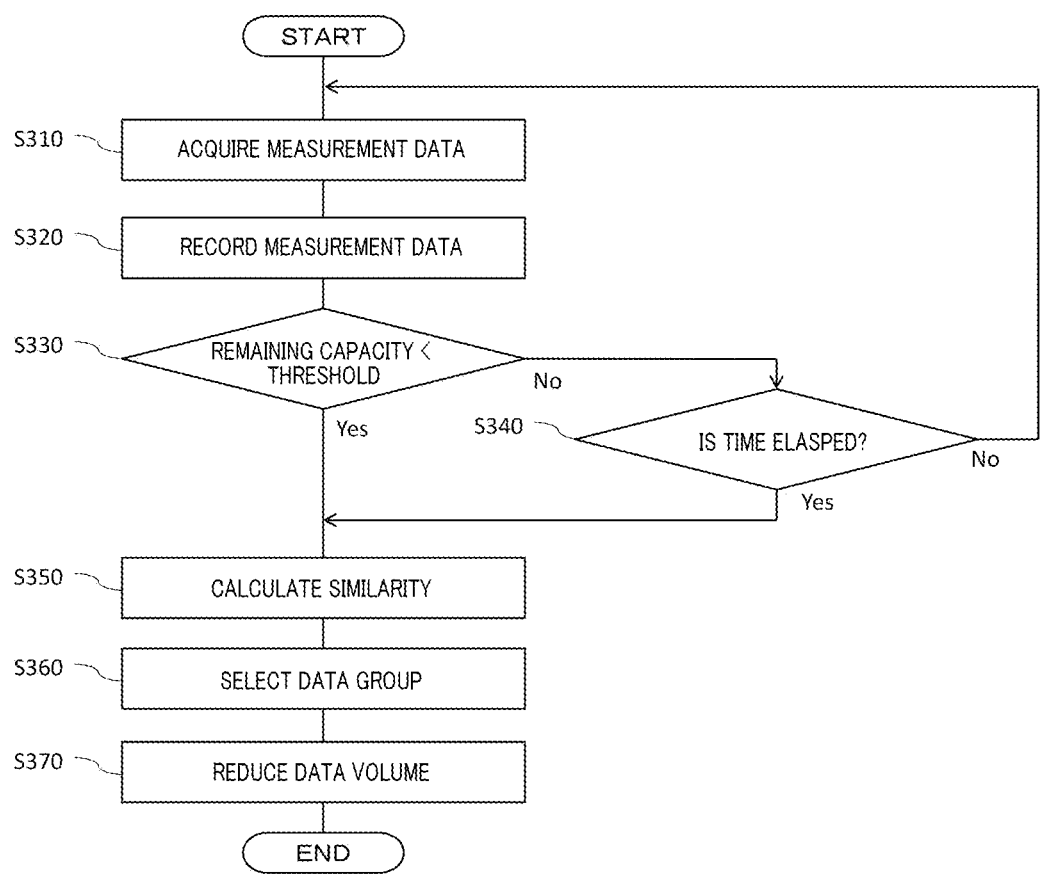
FIG. 3 illustrates an example of a flow in which the data volume to be recorded by the data management system 100 according to this embodiment is reduced.

FIG. 3 illustrates an example of a flow in which the data management system 100 according to this embodiment reduces the data volume to be recorded.

In Step 310, the data management system 100 acquires measurement data. As an example, the data acquisition unit 110 sequentially acquires, for example, the measurement data obtained by measuring the fluid flowing in the flow path from each of the plurality of sensors 20 via a communication network. The data acquisition unit 110 supplies the measurement data sequentially acquired from each of the plurality of sensors 20 to the data recording unit 120.

In Step 320, the data management system 100 records the measurement data. As an example, the data recording unit 120 sequentially records the measurement data acquired by the data acquisition unit 110 in Step 310 for each sensor 20.

In Step 330, the data management system 100 determines whether the remaining recordable capacity for the measurement data falls below a preset threshold. As an example, the data management system 100 calculates the remaining recordable capacity for the measurement data by subtracting the data capacity recorded by the data recording unit 120 in Step 320 from the total capacity that allows the measurement data to be stored. Then, the data management system 100 compares the remaining recordable capacity for the measurement data with a preset threshold. In a case where the remaining recordable capacity for the measurement data does not fall below the preset threshold (No), the data management system 100 proceeds to Step 340.

In Step 340, the data management system 100 determines whether a preset time has elapsed. Such a preset time may be, for example, an elapsed time after the measurement data is recorded in Step 320. Instead or in addition, the preset time may be an elapsed time after the recorded measurement data has been last accessed. In a case where the preset time has not elapsed (No), the data management system 100 returns to Step 310, and continues the flow.

On the other hand, in a case where it is determined in Step 330 that the remaining recordable capacity for the measurement data falls below the preset threshold (Yes), or where it is determined in Step 340 that the preset time has elapsed (Yes), the data management system 100 proceeds to Step 350.

In Step 350, the data management system 100 calculates a similarity. As an example, the similarity calculation unit 130 browses the measurement data recorded by the data recording unit 120 in Step 320. Then, the similarity calculation unit 130 calculates, for each piece of the measurement data acquired from the plurality of sensors 20, a similarity of a time-series change with the measurement data acquired from the other sensor 20 installed either in the upstream and downstream from itself in the flow path.

For example, the similarity calculation unit 130 compares the time-series change of the measurement data acquired from the sensor 20a with each of the time-series changes of the measurement data acquired from the sensor 20b and the sensor 20c which are installed in the downstream from itself so as to calculate the similarity. More specifically, the similarity calculation unit 130 compares the measurement data acquired from the sensor 20a in the target period (for example, from T=1+m to 10+m) with each piece of the measurement data acquired from the sensor 20b and the sensor 20c in the corresponding period (for example, from time T=1+m+n to 10+m+n) while shifting the start point of the period respectively (while incrementing each of n and m with n=0 and m=0 as initial values) so as to calculate the similarity.

That is, the similarity calculation unit 130 compares the measurement data acquired from the sensor 20a in the period of time T=1 to 10 with each piece of the measurement data acquired from the sensor 20b and the sensor 20c in the period of time T=1 to 10 so as to calculate the similarity. Next, the similarity calculation unit 130 increments n and compares the measurement data acquired from the sensor 20a in the period of time T=2 to 11 with each piece of the measurement data acquired from the sensor 20b and the sensor 20c in the period of time T=1 to 10 so as to calculate the similarity. Next, the similarity calculation unit 130 further increments n and compares the measurement data acquired from the sensor 20a in the period of time T=3 to 12 with each piece of the measurement data acquired from the sensor 20b and the sensor 20c in the period of time T=1 to 10 so as to calculate the similarity. In this way, the similarity calculation unit 130 calculates the similarity while incrementing n until the measurement data acquired from the sensor 20a in the period of time T=1 to 10 is compared with each piece of the measurement data acquired from the sensor 20b and the sensor 20c in the period of time T=21 to 30.

Next, the similarity calculation unit 130 initializes n, increments m, and compares the measurement data acquired from the sensor 20a in the period of time T=2 to 11 with each piece of the measurement data acquired from the sensor 20b and the sensor 20c in the period of time T=2 to 11 so as to calculate the similarity. Next, the similarity calculation unit 130 increments n and compares the measurement data acquired from the sensor 20a in the period of time T=3 to 12 with each piece of the measurement data acquired from the sensor 20b and the sensor 20c in the period of time T=2 to 11 so as to calculate the similarity. In this way, the similarity calculation unit 130 calculates the similarity while incrementing each of n and m until the measurement data acquired from the sensor 20a in the period of time T=21 to 30 is compared with each piece of the measurement data acquired from the sensor 20b and the sensor 20c in the period of time T=21 to 30. In the above description, a case where the similarity calculation unit 130 calculates the similarity by incrementing each of n and m has been described as an example. Thus, the similarity calculation unit 130 can calculate the similarity even in a case where it is not clear how much time is deviated between the sensors 20. On the other hand, in a case where it is already known that the time among each of the sensors is deviated, the similarity calculation unit 130 may calculate the similarity while incrementing only m with n as a constant value. That is, in a case where the time deviation between the sensor 20a and the sensor 20b is a constant value (for example, 10), the similarity calculation unit 130 may calculate the similarity by comparing the measurement data acquired from the sensor 20a in the period of time T=1+m to 10+m with the measurement data acquired from the sensor 20b in the period of time T=11+m to 20+m while incrementing m. Similarly, in a case where the time deviation between the sensor 20b and the sensor 20c is a constant value (for example, 10), the similarity calculation unit 130 may calculate the similarity by comparing the measurement data acquired from the sensor 20b in the period of time T=11+m to 20+m with the measurement data acquired from the sensor 20c in the period of time T=21+m to 30+m while increasing m.

Similarly, the similarity calculation unit 130 compares the time-series change of the measurement data acquired from the sensor 20b with the time-series change of the measurement data acquired from the sensor 20c which is installed in the downstream from itself so as to calculate the similarity. The similarity calculation unit 130 supplies the information of the similarity thus calculated to the data selection unit 140.

In Step 360, the data management system selects a data group which is to be reduced in the data volume. As an example, the data selection unit 140 refers to the information on the similarity which is calculated by the similarity calculation unit 130 in Step 350. Then, in Step 320, a data group which is to be reduced in the data volume is selected among the measurement data from the plurality of sensors 20 which is recorded by the data recording unit 120. At this time, for example, in a case where the similarity between the time-series change of the measurement data acquired from the other sensor 20 in the corresponding period and the time-series change of the measurement data acquired from the target sensor 20 in the target period falls within a preset range, the data selection unit 140 may select the measurement data acquired from the target sensor 20 in the target period as the data group which is to be reduced in the data volume.

More specifically, in a case where the similarity between the measurement data acquired from the sensor 20a in the period of time T=1 to 10 and the measurement data acquired from the sensor 20b in the period of time T=11 to 20 falls within a preset range, the data selection unit 140 may select the measurement data acquired from the sensor 20 installed on the more upstream side, that is, the measurement data acquired from the sensor 20a in the period of time T=1 to 10 as the data group to be reduced in the data volume. More specifically, in a case where the similarity between the measurement data acquired from the sensor 20a in the period of time T=1 to 10 and the measurement data acquired from the sensor 20c in the period of time T=21 to 30 falls within a preset range, the data selection unit 140 may select the measurement data acquired from the sensor 20 installed on the more upstream side, that is, the measurement data acquired from the sensor 20a in the period of time T=1 to 10 as the data group to be reduced in the data volume. More specifically, in a case where the similarity between the measurement data acquired from the sensor 20b in the period of time T=11 to 20 and the measurement data acquired from the sensor 20c in the period of time T=21 to 30 falls within a preset range, the data selection unit 140 may select the measurement data acquired from the sensor 20 installed on the more upstream side, that is, the measurement data acquired from the sensor 20b in the period of time T=11 to 20 as the data group to be reduced in the data volume.

In a case where the fluid flows from the upstream to the downstream in the flow path while being subjected to various processes, the time-series change of the measurement data can be similar in the upstream and the downstream in the same flow path due to the relationship of momentum balance and the thermodynamic relationship. For example, in a case where there is a heat exchanger between the sensor 20a in the upstream and the sensor 20b in the midstream, and a process of cooling (heating) is gone through in the middle of the flow path, an approximately similar change may occur to the measurement data before the fluid enters the heat exchanger (for example, the measurement data acquired from the sensor 20a in time T=1 to 10) and the measurement data after the heat exchanger (for example, the measurement data acquired from the sensor 20b in time T=11 to 20). In this way, in a case where the time-series changes of the measurement data at the upstream and the downstream are similar, if the measurement data on either side and the similarity ratio are known, the measurement data on the other side can be predicted and reproduced to some extent. The data selection unit 140 selects the measurement data having such a high reproducibility as the data group to be reduced in the data volume.

In the above description, a case where the data selection unit 140 selects the measurement data from the sensor 20 installed on the upstream side as the data group to be reduced in the data volume when the similarity falls within a preset range has been described as an example. In this case, the data selection unit 140 is preferable in that the measurement data on a closer side to the output of a product can be left. However, the invention is not limited to this. The data selection unit 140 may select the measurement data from the sensor 20 installed on the downstream side as the data group to be reduced in the data volume when the similarity falls within a preset range. The data selection unit 140 supplies the information on the data group thus selected to the data volume reduction unit 150.

In Step 370, the data management system 100 reduces the data volume to be recorded. As an example, the data volume reduction unit 150 reduces the data volume to be recorded for the target sensor 20 among the plurality of sensors 20 based on the measurement data acquired from the other sensor 20 installed either on the upstream or downstream from itself in the flow path. For example, the data volume reduction unit 150 specifies a target period and a target sensor 20 to be reduced in the data volume by referring to the information on the data group selected by the data selection unit 140 in Step 360. Then, the data volume reduction unit 150 reduces the data volume to be recorded for the measurement data acquired from the target sensor 20 in the target period among the measurement data recorded by the data recording unit 120.

In this way, the data volume reduction unit 150 reduces the data volume to be recorded for the target sensor 20 in the target period based on the time-series change of the measurement data acquired from the other sensor 20 in the corresponding period. More specifically, in a case where the similarity between the time-series change of the measurement data acquired from the other sensor 20 in the corresponding period and the time-series change of the measurement data acquired from the target sensor 20 in the target period falls within a preset range, the data volume reduction unit 150 reduces the data volume to be recorded for the target sensor 20 in the target period.

In other words, the data volume reduction unit 150 may reduce the data volume to be recorded for the measurement data acquired from the sensor 20a in the period of 1 to 10, for example, in a case where the similarity between the time-series change of the measurement data acquired from the sensor 20b in the period of time T=11 to 20 and the time-series change of the measurement data acquired from the sensor 20a in the period of time T=1 to 10 falls within a preset range. Similarly, the data volume reduction unit 150 may reduce the data volume to be recorded for the measurement data acquired from the sensor 20a in the period of 1 to 10 in a case where the similarity between the time-series change of the measurement data acquired from the sensor 20c in the period of time T=21 to 30 and the time-series change of the measurement data acquired from the sensor 20a in the period of time T=1 to 10 falls within a preset range. Similarly, the data volume reduction unit 150 may reduce the data volume to be recorded for the measurement data acquired from the sensor 20b in the period of 11 to 20 in a case where the similarity between the time-series change of the measurement data acquired from the sensor 20c in the period of time T=21 to 30 and the time-series change of the measurement data acquired from the sensor 20b in the period of time T=11 to 20 falls within a preset range.

At this time, the data volume reduction unit 150 may reduce the number of samples per unit time of the measurement data acquired from the target sensor 20. For example, in Step 360, it is assumed that the measurement data acquired by the data selection unit 140 from the sensor 20a in the period of time T=1 to 10 is selected as the data group to be reduced in the data volume. In this case, the data volume reduction unit 150 may delete the measurement data acquired from the sensor 20a at the even number of times (for example, time T=2, 4, 6, and 8) excluding time T=1 at the start point of the period and time T=10 at the end point among the measurement data acquired from the sensor 20a in the period of time T=1 to 10.

Instead or in addition, the data volume reduction unit 150 may reduce the data size per one piece of the measurement data acquired from the target sensor 20. For example, in Step 360, it is assumed that the measurement data acquired by the data selection unit 140 from the sensor 20b in the period of time T=11 to 20 is selected as the data group to be reduced in the data volume. In this case, the data volume reduction unit 150 may reduce the data size per one pieces of the measurement data acquired from the sensor 20b at the number of times (for example, time T=12 to 19) excluding time T=11 at the start point of the period and time T=20 at the end point from among the measurement data acquired from the sensor 20b in the period of time T=11 to 20. At this time, the data volume reduction unit 150 may round off, for example, the third decimal number to the nearest integer to obtain each time-series data consisting of the second decimal number in a case where the time-series data acquired from the sensor 20b consists of a data group of the third decimal point. In the above description, a case where the rounding-off is used when the data volume reduction unit 150 reduces the number of valid digits has been described as an example, but is not limited thereto. The data volume reduction unit 150 may use a method different from the rounding-off, such as rounding down and rounding up. In addition, the data volume reduction unit 150 may reduce the data volume of the measurement data by reducing the number of bits for quantizing each of the measurement data having a dynamic range in a chronological order (for example, reducing the number of bits from 16 to 8 bits).

In this way, the data volume reduction unit 150 may delete a part of the measurement data by reducing the number of samples per unit time such as thinning the samples in the direction of time axis of the measurement data, or may delete a part of the measurement data by reducing the data size per one piece of data such as reducing a bit width in the direction of size axis (reducing the number of quantized bits). That is, the data volume reduction unit 150 may delete a part of the measurement data acquired from the target sensor 20 for at least one time excluding the start point and the end point of the corresponding period. In the above description, a case where the data management system 100 manages one-dimensional measurement data has been described as an example. However, the invention is not limited to this. The data management system 100 may manage two-dimensional measurement data. That is, in the above description, the data management system 100 acquires and manages the one-dimensional data from one sensor with respect to one time. However, instead or in addition, the data management system 100 may acquire and manage two-dimensional data such as thermographic image data from one sensor with respect to one time. In such a case, the data volume reduction unit 150 reduces the data volume to be recorded for the two-dimensional measurement data acquired from the target sensor. For example, the data volume reduction unit 150 may reduce the number of frames per unit time of the measurement data when reducing the number of samples per unit time of the measurement data acquired from the target sensor 20. In addition, the data volume reduction unit 150 may reduce the number of pixels per one frame or the number of bits per one pixel of the measurement data when reducing the data size per one piece of the measurement data acquired from the target sensor 20.

The data management system 100 reduces the data volume to be recorded in Step 370 and ends the flow. In this way, the data volume reduction unit 150 may reduce the data volume to be recorded for the target sensor 20 in response to the remaining recordable capacity for the measurement data to falling below a preset threshold (in response to being determined as Yes in Step 230). The data volume reduction unit 150 may reduce the data volume to be recorded for the target sensor 20 in response to elapse of a preset time (in response to being determined as Yes in Step 240).

For example, it is expected that the data volume is explosively increased, for example, by combining a process control system in an operational technology (OT) region with a system in an information technology (IT) region or the like. In such a situation, it is not practical to record all data as it is, so there is a need to reduce the data volume or make a selection. Conventionally, a technique for automatically estimating a process value for piping is known. However, in the conventional technology, the process value is acquired by estimation in a case where a measuring instrument is installed at a position away from the device, and the data volume to be recorded is not reduced.

On the contrary, the data management system 100 according to this embodiment reduces the data volume to be recorded for the target sensor 20 based on the measurement data acquired from the other sensor 20 installed either on the upstream or downstream from itself in the flow path. Thus, according to the data management system 100 of this embodiment, in a case where the measurement data from the target sensor 20 can be predicted to some degree using the measurement data obtained by measurement at different positions in the same flow path, the data volume to be recorded for the measurement data from the sensor 20 can be reduced, and the measurement data can be managed efficiently. Even if the data management system 100 according to this embodiment is selected as the target sensor 20, the data volume of the measurement data to be recorded for the sensor 20 is merely reduced later, and the data management system 100 continues to acquire and record the measurement data from the sensor 20. Thus, according to the data management system 100 of this embodiment, the measurement data from the sensor 20 can be used for real time control even if there is a steep change in the process or the like, for example.

The data management system 100 according to this embodiment reduces the data volume of the measurement data to be recorded with respect to the target sensor 20 based on the measurement data acquired from the other sensor 20 which has the same type of the physical quantity to be measured. Thus, according to the data management system 100 of this embodiment, the data volume can be reduced without performing complex operations such as unit conversion.

The data management system 100 according to this embodiment reduces the data volume of the measurement data to be recorded with respect to the target sensor 20 based on the time-series change of the measurement data acquired from the other sensor 20. Thus, according to the data management system 100 of this embodiment, the time-series change of the measurement data measured at different positions in the flow path where the same fluid flows is taken into consideration, so that the data volume can be reduced for the measurement data having more reproducibility.

At this time, the data management system 100 according to this embodiment reduces the data volume of the data group which has the similarity of the time-series change of the measurement data falling within a preset range. Thus, according to the data management system 100 of this embodiment, the data volume can be reduced for the measurement data which can be reproduced with higher accuracy by the relationship between the time-series change of the measurement data from the other sensor 20 and the similarity ratio. In other words, in a case where the similarity of the time-series change of the measurement data does not fall within a preset range, the data volume reduction unit 150 can stop the reduction process of the data volume. Thus, according to the data management system 100, in a case where there occurs a peculiar change in the measurement data in the middle of the flow path, it is possible to prevent that the data volume up to that data is reduced.

The data management system 100 according to this embodiment deletes a part of the measurement data acquired from the target sensor 20 for at least one time excluding the start point and end point of the target period. Thus, the data management system 100 according to this embodiment can reduce the data volume while remaining data at the start point and the end point of the period which are important when reproducing the measurement data from the similarity relationship.

In addition, when the data volume of the measurement data is reduced, the data management system 100 according to this embodiment reduces the number of samples per unit time of the recorded measurement data, or reduces the data size per one piece of the recorded measurement data. Thus, according to the data management system 100 of this embodiment, it is possible to selectively delete at least a part of the measurement data in either the direction of time axis or the direction of size axis according to the characteristics of the measurement data.

The data management system 100 according to this embodiment reduces the data volume of the measurement data in a case where the recordable remaining capacity is less than a preset threshold or when a preset time has elapsed. Thus, according to the data management system of this embodiment, it is possible to delete a part of the measurement data at a desired timing when the data volume of the measurement data to be recorded is reduced.

In the above description, a case where the data management system 100 manages the measurement data from the plurality of sensors 20 of which the physical quantities to be measured are the same (the flow rate in the above description) has been described as an example. However, the invention is not limited to this. The data management system 100 may manage the measurement data from the plurality of sensors 20 of which the physical quantities to be measured are respectively different (for example, flow rate, temperature, and pressure). In such a case, the data management system 100 may detect an abnormality based on the relationship of the measurement data from the plurality of sensors 20 of which the physical quantities to be measured are different. That is, the data management system 100 may stop the reduction process of the data volume in a case where one physical quantity (for example, pressure) does not show the similarity relationship at different positions (for example, the upstream and the downstream) of the flow path regardless of the fact that other physical quantities (for example, flow rate and temperature) show similarity relationship at different positions (for example, the upstream and the downstream) of the flow path. At this time, the data management system 100 may determine a failure such as a fault of the sensor 20 which has measured the one physical quantity, and notify the fact to an operator.

Here, in the above description, a case where the data management system 100 reduces the data volume of the measurement data from the target sensor 20 without remaining the acquired raw measurement data has been described as an example in this embodiment. However, the invention is not limited to this.

Figure 4:
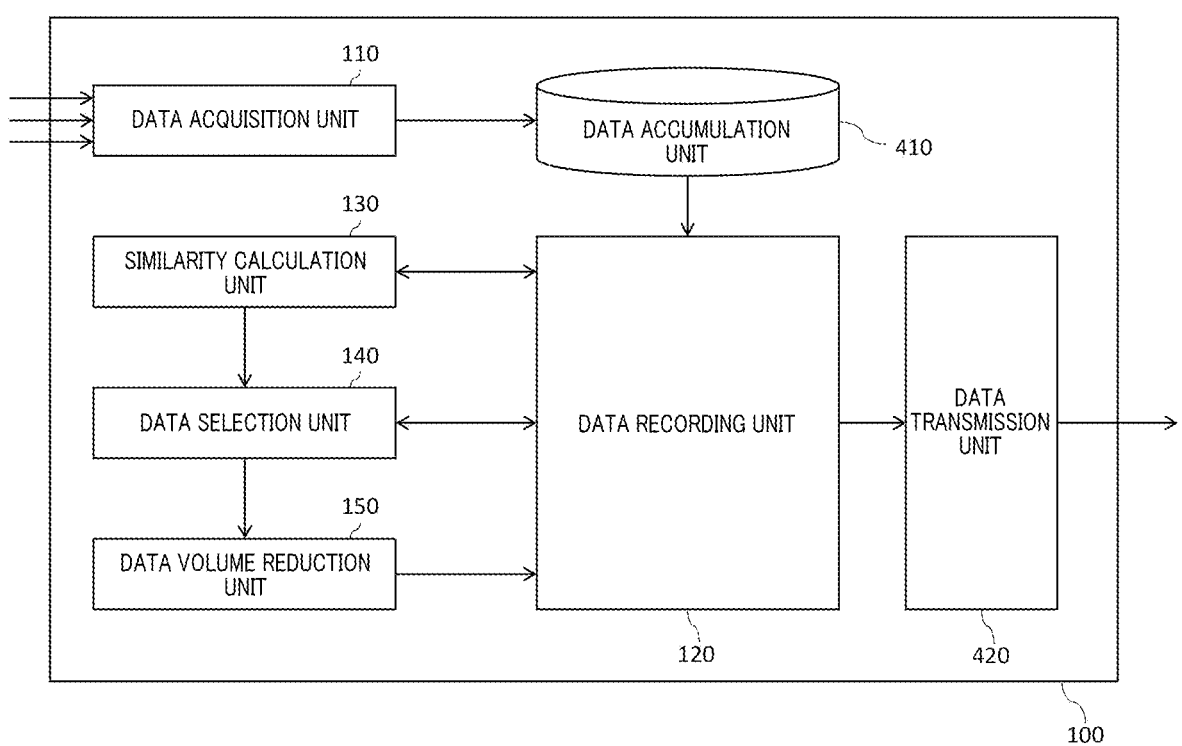
FIG. 4 illustrates an example of a block diagram of the data management system 100 according to a modification of this embodiment.

FIG. 4 illustrates an example of a block diagram of the data management system 100 according to a modification of this embodiment. In FIG. 4, the same symbol is attached to a member having the same function and configuration as those in FIG. 1, and the description will be omitted except for the following differences. The data management system 100 according to this modification may be installed in, for example, the OT region, or may transmit the measurement data, which is acquired from the sensor 20 installed in the OT region, to another data utilization device installed in the IT region. The data management system 100 according to this modification further includes a data accumulation unit 410 and a data transmission unit 420.

In the data management system 100 according to this modification, the data acquisition unit 110 supplies the measurement data acquired from each of the plurality of sensors 20 to the data accumulation unit 410 instead of the data recording unit 120.

The data accumulation unit 410 accumulates the measurement data. As an example, the data accumulation unit 410 may sequentially record all the measurement data which is supplied from the data acquisition unit 110 for each sensor 20. Then, the data accumulation unit 410 supplies the measurement data to be transmitted to another data utilization device that utilizes the measurement data among the accumulated measurement data, to the data recording unit 120. Such a transmission target may be, for example, selected based on a user input, or may be automatically selected by the data management system 100.

Therefore, in the data management system 100 according to this modification, the data recording unit 120 records the measurement data to be transmitted to another data utilization device among the measurement data acquired from each of the plurality of sensors.

In the data management system 100 according to this modification, the data volume reduction unit 150 reduces the data volume for recording the measurement data from the target sensor 20 in this embodiment among the measurement data to be transmitted recorded in the data recording unit 120.

Then, the data transmission unit 420 transmits the measurement data recorded in the data recording unit 120 after the data volume of the measurement data from the target sensor 20 is reduced, that is, the measurement data to be transmitted which is reduced in the data volume to the another data utilization device, which utilizes the measurement data, via a network.

In this way, the data management system 100 according to this modification reduces the data volume of the measurement data from the target sensor 20 among the measurement data to be transmitted. Thus, according to the data management system 100 of this modification, for example, when the measurement data is transmitted from the OT region to the IT region, it is possible to reduce the data volume to be transmitted from the data management system 100. That is, in the data management system 100 according to this embodiment, reducing the data volume of the measurement data from the target sensor 20 may include excluding the measurement data from the transmission target to the other data utilization device in addition to completely deleting a part of the measurement data from the recording region in a broad sense.

Various embodiments of the invention may be described with reference to a flowchart and a block diagram. The block here may be (1) a step of the process in which the operation is performed, or (2) a section of a device which serves to execute the operation. The specific step and section may be mounted in a dedicated circuit, which is supplied together with a computer-readable instruction stored on a computer-readable medium, and/or a processor which is supplied together with a computer-readable instruction stored on the computer-readable medium. The dedicated circuit may include a digital and/or analog hardware circuit, or may include an integrated circuit (IC) and/or a discrete circuit. The programmable circuit may include a reconstructive hardware circuit including a logical AND, a logical OR, a logical XOR, a logical NAND, a logical NOR, memory elements such as other logical operations, flip-flops, registers, field programmable gate arrays (FPGAs), programmable logic arrays (PLAs), and the like.

The computer readable medium may include any tangible device that can store instructions executed by the appropriate device, and as a result, the computer-readable medium having instructions stored in the device includes an instruction that can be executed to create a means for performing the operation designated in a flowchart or block diagram. Examples of the computer-readable medium may include electronic storage medium, magnetic storage medium, optical storage medium, electromagnetic storage medium, semiconductor storage medium, and the like. More specific examples of the computer-readable medium may include floppy (registered trademark) disks, diskettes, hard disks, random access memories (RAM), read-only memories (ROM), erasable programmable read-only memories (EPROM or flash memory), electrically erasable programmable read-only memories (EEPROM), static random access memories (SRAM), compact disk read-only memories (CD-ROM), digital versatile disks (DVD), Blu-ray (registered trademark) disks, memory sticks, integrated circuit cards, and the like.

The computer-readable instructions may include either source code or object code written in any combination of one or more programming languages, including assembler instructions, instruction set architecture (ISA) instructions, machine instructions, machine-dependent instructions, microcode, firmware instructions, state setting data, or object-oriented programming languages such as Smalltalk (registered trademark), JAVA (registered trademark), C++, etc., and traditional procedural programming languages such as "C" programming languages or similar programming languages.

The computer-readable instructions are provided locally or over a wide area network (WAN) such as a local area network (LAN), the Internet, etc., for processors or programmable circuits of general purpose computers, special purpose computers, or other programmable data processors. A computer-readable instruction may be executed to create a means for performing an operation specified in a flowchart or block diagram. Examples of processors include computer processors, processing units, microprocessors, digital signal processors, controllers, microcontrollers, and the like.

Figure 5:
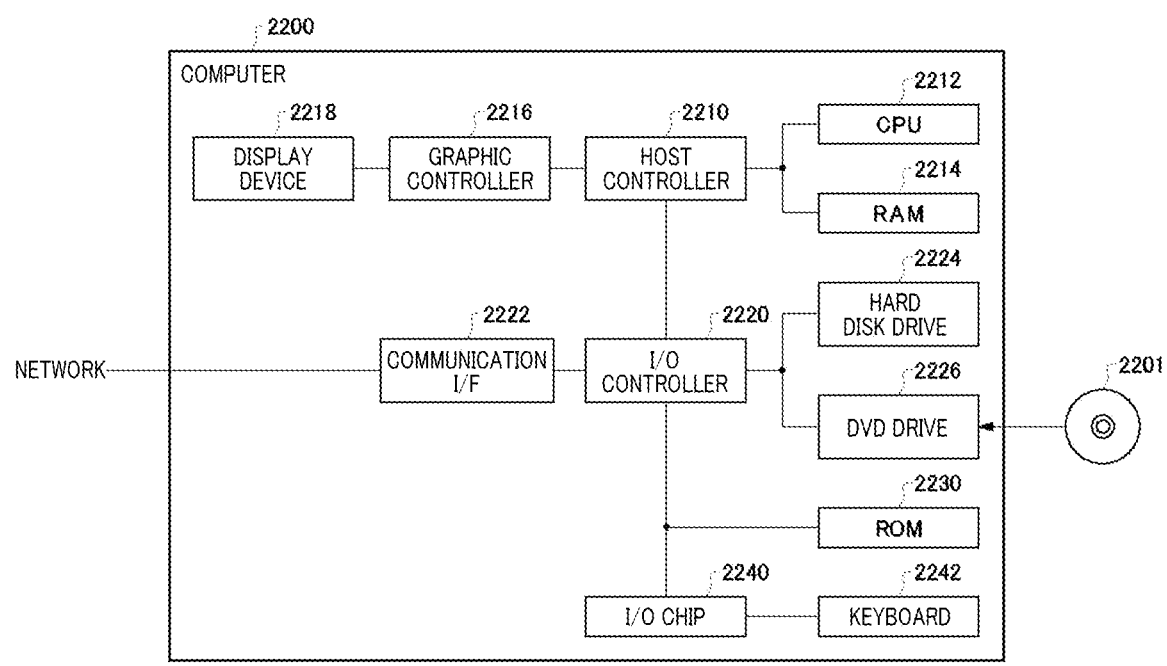
FIG. 5 illustrates an example of a computer 2200 in which a plurality of aspects of the invention may be embodied in whole or in part.

FIG. 5 illustrates an example of a computer 2200 in which a plurality of embodiments of the invention may be embodied in whole or in part. A program installed on the computer 2200 can cause the computer 2200 to perform operations associated with the device according to the embodiments of the invention or to function as one or more sections of the device, may cause the computer 2200 to perform the operations or the one or more sections, and/or may cause the computer 2200 to perform the process according to the embodiments of the invention or the steps of the process. Such a program may be executed by a CPU 2212 to have the computer 2200 perform a specific operation associated with some or all of the flowchart and the blocks of the block diagram described in this specification.

The computer 2200 according to this embodiment includes the CPU 2212, a RAM 2214, a graphic controller 2216, and a display device 2218, which are interconnected by a host controller 2210. The computer 2200 also includes input/output units such as a communication interface 2222, a hard disk drive 2224, a DVD-ROM drive 2226, and an IC card drive, which are connected to the host controller 2210 via an input/output controller 2220. The computer also includes a legacy input/output unit such as a ROM 2230 and a keyboard 2242, which are connected to the input/output controller 2220 via an input/output chip 2240.

The CPU 2212 operates according to a program stored in the ROM 2230 and RAM 2214, thereby controlling each unit. The graphic controller 2216 acquires image data generated by the CPU 2212 in a frame buffer or the like provided in the RAM 2214 or itself, so that the image data is displayed on the display device 2218.

The communication interface 2222 communicates with other electronic devices over a network. The hard disk drive 2224 stores programs and data used by the CPU 2212 in the computer 2200. The DVD-ROM drive 2226 reads the program or data from a DVD-ROM 2201 and provides the program or data to the hard disk drive 2224 via the RAM 2214. The IC card drive reads the program and data from the IC card and/or writes the program and data to the IC card.

The ROM 2230 stores in it a boot program or the like executed by the computer 2200 when activated, and/or a program that depends on the hardware of the computer 2200. The input/output chip 2240 may also connect various input/output units to the input/output controller 2220 via a parallel port, serial port, keyboard port, mouse port, or the like.

The program is provided by a computer-readable medium such as the DVD-ROM 2201 or IC card. The program is read from a computer-readable medium, installed on the hard disk drive 2224, the RAM 2214, or the ROM 2230, which are examples of a computer-readable medium, and executed by the CPU 2212. The information processing described in these programs is read on the computer 2200, resulting in cooperation between the program and the various types of hardware resources described above. The device or method may be configured by realizing the operation or processing of information according to the use of the computer 2200.

For example, when communication is performed between the computer 2200 and an external device, the CPU 2212 executes a communication program loaded into the RAM 2214 and may order the communication interface 2222 to perform communication processing based on the processing described in the communication program. Under the control of the CPU 2212, the communication interface 2222 reads the transmission data stored in the transmission buffer processing area provided within a recording medium such as the RAM 2214, hard disk drive 2224, DVD-ROM 2201, or IC card, transmits the read transmission data to the network, or writes reception data received from the network to a reception buffer processing area which is provided on the recording medium.

Further, the CPU 2212 may set all or necessary portions of files or database stored in an external recording medium such as the hard disk drive 2224, the DVD-ROM drive 2226 (DVD-ROM 2201), an IC card, or the like on the RAM 2214, and may perform various types of processing on the data on the RAM 2214. The CPU 2212 then writes back the processed data to the external recording medium.

Various types of information, such as various types of programs, data, tables, and databases, may be stored in the recording medium and processed. The CPU 2212 may perform various types of processing on data read from the RAM 2214 including various types of operations, information processing, conditional determination, conditional branching, unconditional branching, information search/replacement, etc., which are described throughout the present disclosure and designated by an instruction sequence of the program, and the results may be written back to the RAM 2214. Further, the CPU 2212 may search for information in a file, database, or the like in the recording medium. For example, in a case where a plurality of entries with attribute values for a first attribute associated with an attribute value of a second attribute are stored in the recording medium, the CPU 2212 searches an entry that matches with the condition among the plurality of entries, where the attribute value of the first attribute is specified, reads the attribute value of the second attribute stored in the entry, thereby the attribute value of the second attribute associated with the first attribute that satisfies the preset condition may be obtained.

The program or software module described above may be stored on the computer 2200 or in a computer-readable medium near the computer 2200. Further, a recording medium such as a hard disk or RAM provided in a dedicated communication network or a server system connected to the Internet can be used as a computer-readable medium, thereby providing a program to the computer 2200 via a network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10 plant
20 sensor
100 data management system
110 data acquisition unit
120 data recording unit
130 similarity calculation unit
140 data selection unit
150 data volume reduction unit
410 data accumulation unit
420 data transmission unit
2200 computer
2201 DVD-ROM
2210 host controller
2212 CPU
2214 RAM
2216 graphic controller
2218 display device
2220 input/output controller
2222 communication interface
2224 hard disk drive
2226 DVD-ROM drive
2230 ROM
2240 input/output chip
2242 keyboard

What is claimed is:

1. A data management system, comprising:
a data acquisition unit configured to acquire, from each of a plurality of sensors, measurement data obtained by measuring a fluid flowing in a flow path;
a data recording unit configured to record the acquired measurement data; and
a data volume reduction unit configured to reduce a data volume to be recorded for a target sensor based on the measurement data acquired from another sensor installed in either an upstream or a downstream from the target sensor in the flow path among the plurality of sensors,
wherein the data volume reduction unit is configured to reduce a data volume to be recorded for the target sensor in a target period based on a time-series change of the measurement data acquired from the other sensor in a corresponding period,
wherein selected portions of the measurement data from the target sensor that are to be reduced in data volume are selected based upon the selected portions that are to be reduced in data volume being reproducible from the measurement data acquired from the other sensor, and
wherein, in a case where a similarity between the time-series change of the measurement data acquired from the other sensor in the corresponding period and a time-series change of the measurement data acquired from the target sensor in the target period falls within a preset range, the data volume reduction unit is configured to reduce a data volume to be recorded for the target sensor in the target period.

2. The data management system according to claim 1, wherein a physical quantity to be measured of the other sensor is the same as the physical quantity to be measured of the target sensor.

3. The data management system according to claim 2, wherein the data volume reduction unit is configured to reduce the number of samples per unit time of the measurement data acquired from the target sensor.

4. The data management system according to claim 2, wherein the data volume reduction unit is configured to reduce a data size per one piece of the measurement data acquired from the target sensor.

5. The data management system according to claim 2, wherein the data volume reduction unit is configured to reduce a data volume to be recorded for the target sensor in response to elapse of a preset time.

6. The data management system according to claim 2, wherein the data volume reduction unit is configured to reduce a data volume to be recorded for the target sensor in response to remaining recordable capacity for the measurement data falling below a preset threshold.

7. The data management system according to claim 2, further comprising:
a data transmission unit configured to transmit the measurement data after a data volume is reduced to another data utilization device which utilizes the measurement data.

8. The data management system according to claim 2, wherein the data volume reduction unit is configured to delete a part of the measurement data acquired from the target sensor for a plurality of times excluding a start point and an end point of the target period.

9. The data management system according to claim 1, wherein the data volume reduction unit is configured to delete a part of the measurement data acquired from the target sensor for at least one time excluding a start point and an end point of the target period.

10. The data management system according to claim 1, wherein the data volume reduction unit is configured to reduce the number of samples per unit time of the measurement data acquired from the target sensor.

11. The data management system according to claim 1, wherein the data volume reduction unit is configured to reduce a data size per one piece of the measurement data acquired from the target sensor.

12. The data management system according to claim 1, wherein the data volume reduction unit is configured to reduce a data volume to be recorded for the target sensor in response to elapse of a preset time.

13. The data management system according to claim 1, wherein the data volume reduction unit is configured to reduce a data volume to be recorded for the target sensor in response no remaining recordable capacity for the measurement data falling below a preset threshold.

14. The data management system according to claim 1, further comprising:
a data transmission unit configured to transmit the measurement data after a data volume is reduced to another data utilization device which utilizes the measurement data.

15. The data management system according to claim 1, wherein the data volume reduction unit is configured to delete a part of the measurement data acquired from the target sensor for a plurality of times excluding a start point and an end point of the target period.

16. A data management method, comprising:
acquiring measurement data obtained by measuring a fluid flowing in a flow path from each of a plurality of sensors;
recording the acquired measurement data; and
reducing a data volume to be recorded for a target sensor based on the measurement data acquired from another sensor installed in either an upstream or a downstream from the target sensor in the flow path among the plurality of sensors,
wherein reducing the data volume to be recorded for the target sensor for a target period is based on a time-series change of the measurement data acquired from the other sensor in a corresponding period,
wherein selected portions of the measurement data from the target sensor that are to be reduced in data volume are selected based upon the selected portions that are to be reduced in data volume being reproducible from the measurement data acquired from the other sensor, and
wherein, in a case where a similarity between the time-series change of the measurement data acquired from the other sensor in the corresponding period and a time-series change of the measurement data acquired from the target sensor in the target period falls within a preset range, the data volume to be recorded for the target sensor in the target period is then reduced.

17. A non-transitory recording medium having a data management program recorded therein,
wherein the program, when executed by a computer, causes the computer to function as:
a data acquisition unit configured to acquire measurement data obtained by measuring a fluid flowing in a flow path from each of a plurality of sensors;
a data recording unit configured to record the acquired measurement data; and
a data volume reduction unit configured to reduce a data volume to be recorded for a target sensor based on the measurement data acquired from another sensor installed in either an upstream or a downstream from the target sensor in the flow path among the plurality of sensors,
wherein the data volume reduction unit is configured to reduce a data volume to be recorded for the target sensor in a target period based on a time-series change of the measurement data acquired from the other sensor in a corresponding period,
wherein selected portions of the measurement data from the target sensor that are to be reduced in data volume are selected based upon the selected portions that are to be reduced in data volume being reproducible from the measurement data acquired from the other sensor, and
wherein, in a case where a similarity between the time-series change of the measurement data acquired from the other sensor in the corresponding period and a time-series change of the measurement data acquired from the target sensor in the target period falls within a preset range, the data volume reduction unit is configured to reduce a data volume to be recorded for the target sensor in the target period.

* * * * *